Jan. 24, 1956  E. S. GARVEY  2,731,915
CUSHION FOOT FOR PORTABLE STAMPING MACHINES
Filed July 12, 1954

INVENTOR.
EDWARD S. GARVEY.
BY
ATTORNEY.

United States Patent Office 2,731,915
Patented Jan. 24, 1956

2,731,915

CUSHION FOOT FOR PORTABLE STAMPING MACHINES

Edward S. Garvey, Clayton, Mo.

Application July 12, 1954, Serial No. 442,733

1 Claim. (Cl. 101—368)

This invention relates to price stamping machines such as disclosed in U. S. Letters Patent No. 2,678,626 issued to me on May 18, 1954, or other portable stamping machines, having a bottom plate and the invention has particular reference to rubber cushion foot adapted to be securely attached to the bottom plate.

Heretofore, rubber pads, or cushions have been secured to the bottom face of an apertured removable bottom plate of the metal frame of a stamping machine by adhesive, and, the practice has been found very unsatisfactory for the reason the pads break loose from the metal plate due to the fact that the adhesive will not satisfactorily cling to the metal surface, therefore the pads become loose and fall off, and it is therefore an object of my invention to provide a pad structure that can be attached to an apertured plate without the use of adhesive.

The primary object of my present invention is to provide a rubber cushion structure for stamping machines that will overcome certain functional objects to, and defects in, the present structures and the method of attaching the cushions or pads to the stamping machine.

Another object of my present invention is to provide an improved, simple and relatively inexpensive rubber cushion foot for price stamping machines, having novel means for attaching the foot to an apertured removable plate set in the bottom of the frame of the machine.

A further object of the invention resides in the provision of a simple and highly effective assembly of a pricing machine bottom plate and rubber cushion feet therefor, which are securely attached thereto without the use of adhesive.

Another object of my present invention is to provide an improved simple and relatively inexpensive rubber cushion foot for price stamping machines, having novel means for attaching the foot to an apertured removable plate at the bottom of the frame of the machine.

A further object of the invention resides in the provision of a simple and highly effective assembly of a pricing machine bottom plate and rubber cushion feet therefor, which are securely attached thereto without the use of adhesive.

To these ends I have provided a rubber cushion foot, for self inking, price stamping and other similar machines, having the peculiar features of construction and mode of attachment, without the use of adhesive, to the bottom detachable plate of the frame of the machine set forth in the following description, the several novel features of the invention being particularly pointed out in the claim hereto annexed.

These and other objects and advantages of my invention will more fully appear from the following description made in connection with the accompanying drawings wherein like characters of reference refer to the same parts throughout the several views, and in which.

Figure 1:
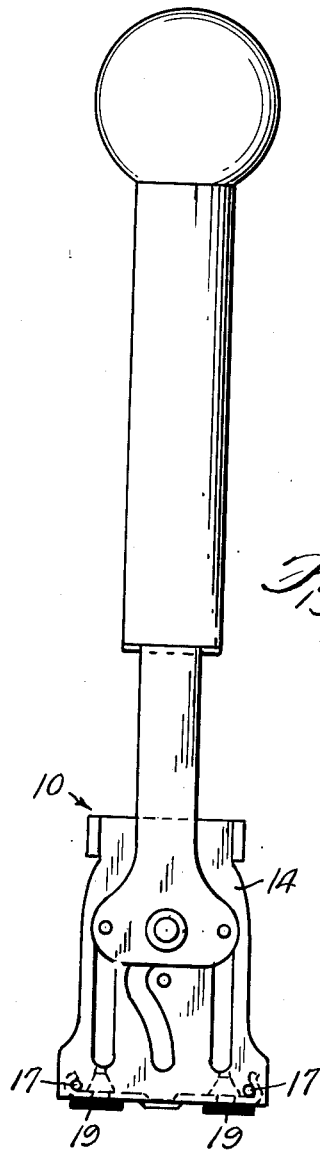
Fig. 1, is a side elevation of a self-inking type price stamping machine embodying the features of my invention.
Figure 2:
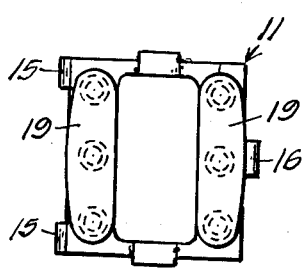
Fig. 2, is a bottom plate view of the machine.
Figure 3:
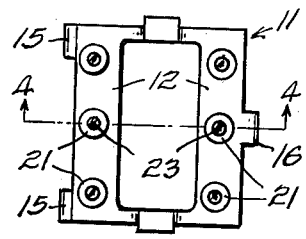
Fig. 3, is a top plan view of the removable bottom plate of the frame of machine showing rubber cushion pads attached thereto.
Figure 4:
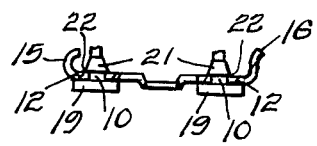
Fig. 4 is a transverse sectional view taken on line 4—4 of Fig. 3.
Figure 5:
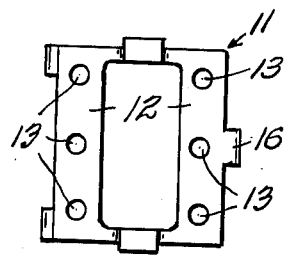
Fig. 5, is a top plan view of the removable bottom plate showing the linings therein.
Figure 6:
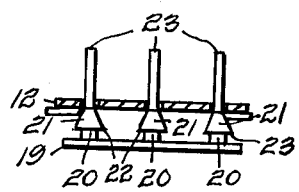
Fig. 6, is a view showing the rubber cushion stem passing through the plate openings and illustrating the rubber pad prior to the truncated conical shaped heads thereof being pulled through the openings of the plate.
Figure 7:
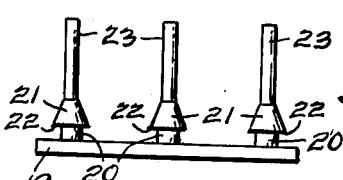
Fig. 7 is an enlarged side elevation of one of the rubber cushion pads embodying the features of my invention.

Referring to the drawings, the reference character 10 designates generally, a self-inking price type of stamping machine. The reference numeral 11 designates, generally, an apertured bottom plate providing thereby a pair of spread apart plate sections 12, each having a plurality of spaced openings 13. The plate 11 is detachably connected with the bottom of the metal frame structure 14 of the stamping machine 10, by means of a pair of ears 15, and a clasp 16, engageable with a pair of cross-pins 17 at the bottom of the frame structure 14.

In the drawings, wherein for the purpose of illustration, is shown a preferred embodiment of my invention, the numeral 18 designates generally, a rubber cushion foot for the stamping machine 10.

The rubber cushion foot comprises a flat elongated rubber pad 19 of any suitable design and thickness and of any desired flexible resiliency. A plurality of cylindrical necks 20, extend upwardly from the pad 19 in the same spaced relation as the openings 13 in the spaced plate sections 12 of the stamping machine, and, the necks 20 are of substantially the same diameter as the plate openings 13, so as to snugly fit the openings 13 with the pads 19 tightly engaging the bottom faces of the spaced apart plate sections 12.

The reference numeral 21 designates a truncated cone shaped head which extends upwardly from and axially with each rubber neck 20 and which is integral with the neck. The top of each truncated cone shaped head 21 is of lesser diameter than the cylindrical neck 20 associated therewith, and the base of each head 21 is of greater diameter than its respective neck so as to provide a circular shoulder 22. The length of each neck 20 is substantially the same as the thickness of the material of the removable bottom plate 11 so that the shoulder 22 of each head 21 may engage that portion of each plate section 12 surrounding the openings 13 therein to hold the pad 19 against displacement on or removal from the bottom face of the plate section 12.

The reference numeral 23 designates a relatively long flexibly-resilient rubber stem preferably of substantially the same diameter as the top of the head 21 and of less diameter than the plate openings 13.

The object of providing each head 21 with the rubber stem 23 is to facilitate attaching the rubber cushion foot to the apertured bottom plate 11 as will be apparent hereinafter.

To attach the rubber cushion foot to either plate section 12 of the removable bottom plate 11 of the stamping machine, the operator threads or pushes the three rubber stems 23 through their respective openings 13 in either plate section 12 until the top of each head 21 engages the bottom of the plate. The operator then pulls on each rubber stem 23 independently of the others until he pulls the truncated cone shaped head through its respective plate opening 13. In trying to pull the heads 21 through the openings 13 they naturally yield, being of rubber, until they are pulled through the plate openings after which the shoulder 22 of each head expands to normal diameter and rests on, or engages the top face of each plate immediately surrounding its respective opening therein, which locks each rubber cushion foot to its respective plate section without the use of adhesive of any kind. After the heads 21 have been pulled through the plate openings, the stems 23 may be severed from the heads by means of a knife or scissors, the rubber stems being no longer of any use.

The many advantages of the herein-described invention will readily suggest themselves to those skilled in the art to which it appertains.

It is to be understood that the form of my invention herewith shown and described, is to be taken as a preferred example of the same, and that various changes in shapes, size and arrangement of parts may be resorted to, without departing from the spirit of my invention, or the scope of the appended claim.

What I claim is:

For use with a portable stamping machine having a frame provided with an apertured bottom plate, a cushion foot for the underside of said bottom plate, said cushion foot comprising a flat pad of rubber-like material, a set of relatively short cylindrical necks provided integrally at spaced points on the upper surface of said pad and adapted to be received in and frictionally fit the apertures in said bottom plate, a set of frusto-conical heads provided integrally on the respective necks and having relatively wide bottom portions affording keeper shoulders adapted to engage the upper surface of said plate, the upper ends of said heads being smaller in diameter than said necks and said heads being resiliently compressible to facilitate passage thereof through the apertures of said plate during installation, and a set of relatively long cylindrical stems provided integrally at and conforming substantially to the diameter of the upper ends of said heads, said stems affording finger-pieces for pulling said heads through the apertures in said plate during installation and being separable from the heads by tearing after the cushion foot is installed.

References Cited in the file of this patent

UNITED STATES PATENTS

| | | |
|---|---|---|
| 1,294,132 | McClure | Feb. 11, 1919 |
| 1,345,255 | Rushworth | June 29, 1920 |
| 2,007,995 | Avery (A) | July 16, 1935 |
| 2,088,566 | Avery (B) | Aug. 3, 1937 |
| 2,150,028 | Dobson | Mar. 17, 1939 |
| 2,209,403 | Kittner et al. | July 30, 1940 |
| 2,312,727 | Nisenson | Mar. 2, 1943 |
| 2,314,828 | Humphries | Mar. 23, 1943 |
| 2,453,991 | Kaemmerling | Nov. 16, 1948 |
| 2,457,930 | Smith | Jan. 4, 1949 |
| 2,466,952 | Jakubowski | Apr. 12, 1949 |
| 2,468,286 | Behlert | Apr. 26, 1949 |